Jan. 9, 1951            C. G. MINOR            2,537,364

TILTABLE CABINET

Filed July 18, 1946            6 Sheets-Sheet 1

Inventor.
Charles G. Minor
By Albert G. McCaleb
Atty

Jan. 9, 1951 C. G. MINOR 2,537,364
TILTABLE CABINET
Filed July 18, 1946 6 Sheets-Sheet 2
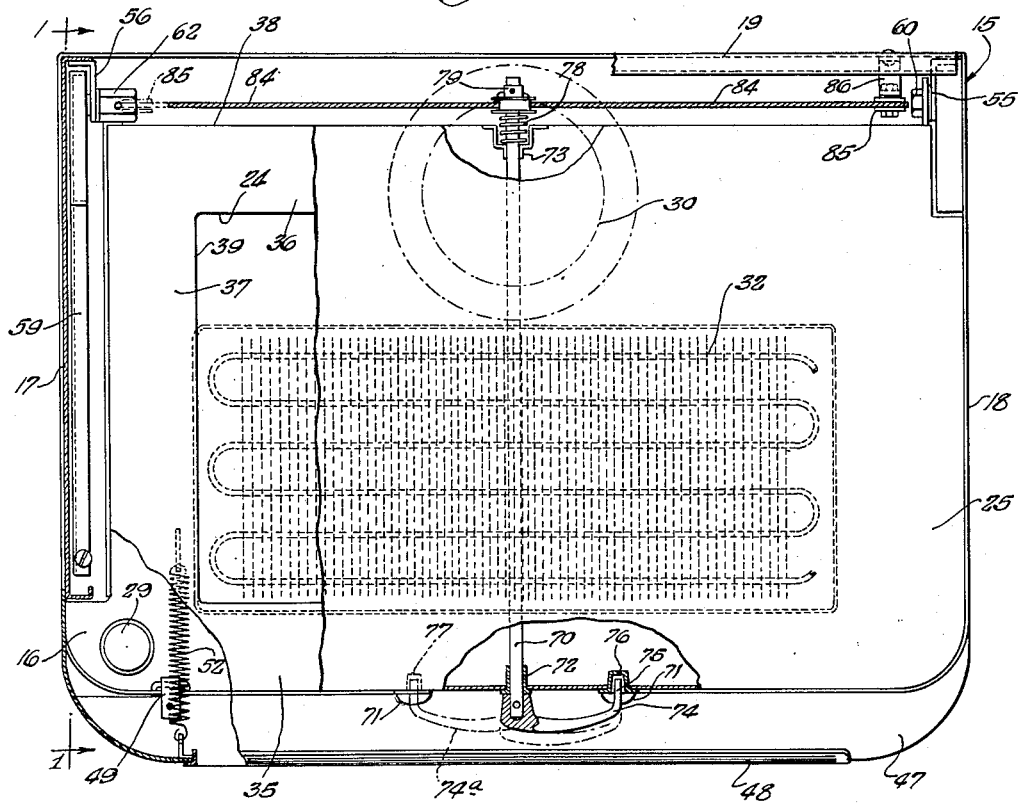
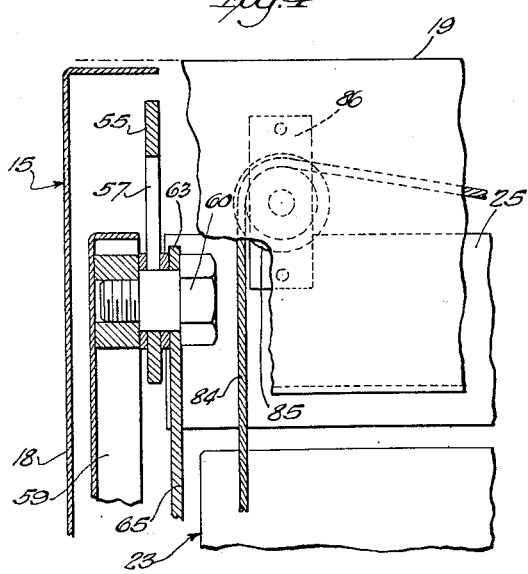
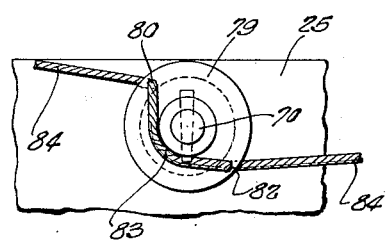
Inventor
Charles G. Minor
By: Albert G. McCaleb
Atty.

Jan. 9, 1951 C. G. MINOR 2,537,364
TILTABLE CABINET
Filed July 18, 1946 6 Sheets-Sheet 3

Inventor
Charles G. Minor
By Albert G. McCaleb
Atty.

Jan. 9, 1951　　　　　　　C. G. MINOR　　　　　　2,537,364
TILTABLE CABINET
Filed July 18, 1946　　　　　　　　　　　　6 Sheets-Sheet 4
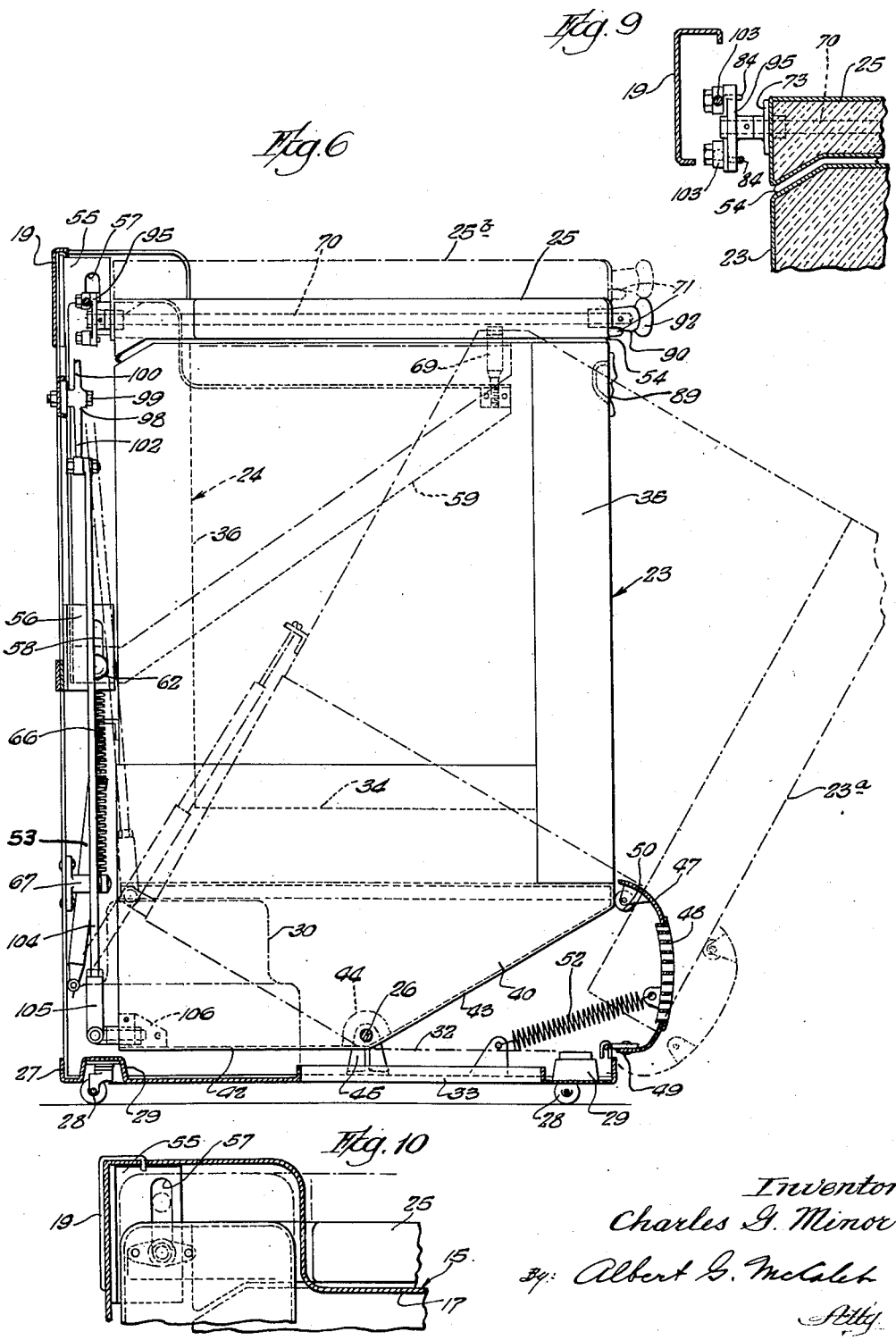
Inventor
Charles G. Minor
By Albert G. McCaleb
Atty

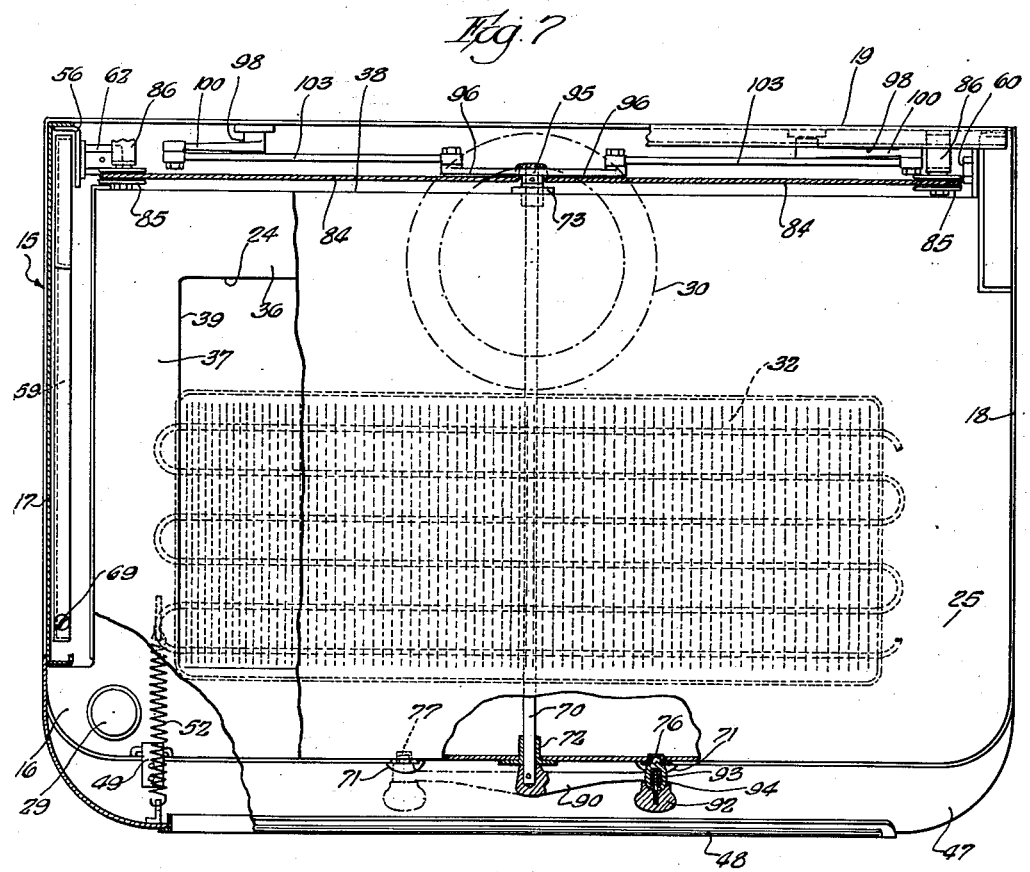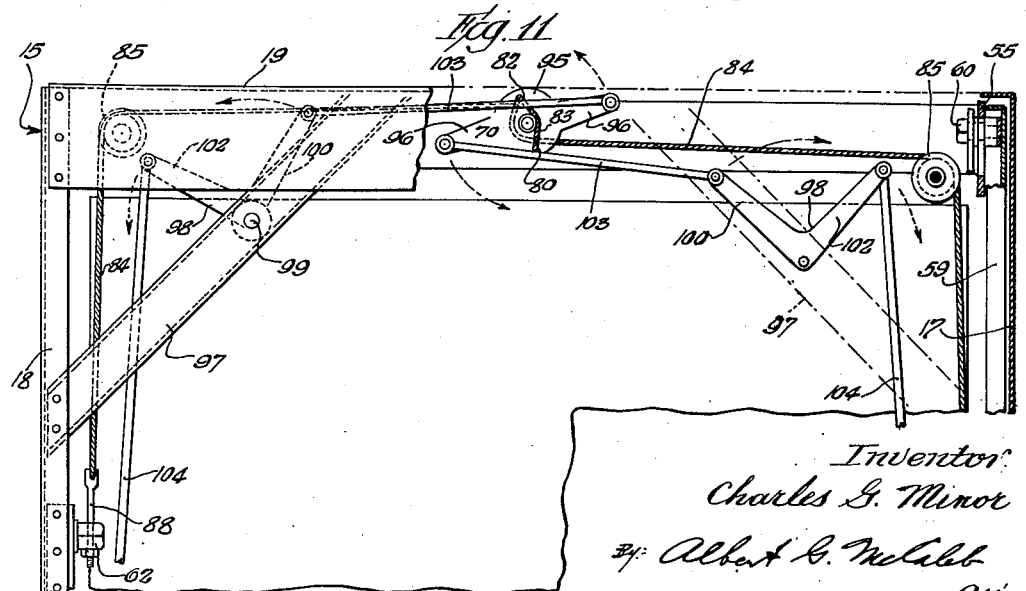

Jan. 9, 1951     C. G. MINOR     2,537,364
TILTABLE CABINET

Filed July 18, 1946     6 Sheets-Sheet 6

Fig. 8

Inventor:
Charles G. Minor
By: Albert G. McCabe
Atty.

Patented Jan. 9, 1951

2,537,364

UNITED STATES PATENT OFFICE 2,537,364

TILTABLE CABINET

Charles G. Minor, Evanston, Ill., assignor of one-half to Albert G. McCaleb, Evanston, Ill.

Application July 18, 1946, Serial No. 684,586

18 Claims. (Cl. 312—155)

My present invention relates to tiltable cabinets and is particularly adapted to use in cabinets which open at the top, such as those utilized for food freezing and the preservation of frozen foods.

One of the objects of this invention is to provide an effective manually operable control mechanism for actuating and retaining the cover of a top-opening tiltable cabinet.

As a further object my invention contemplates the provision of a unique manually operable cover control mechanism suited to use on a tiltable cabinet which opens at the top and has the storage compartment hingedly supported for forward tilting movement to effect ease of access to all parts of the interior.

Another object of the invention is to provide a cover control mechanism for top-opening tiltable cabinets wherein the simple rotary motion of an easily accessible handle moves the cabinet cover to a raised level position such that it may be utilized as a shelf during the placement of material within the cabinet or the removal of desired material therefrom.

Furthermore, my invention contemplates the provision of a control mechanism as set forth in the preceding object and in which the storage compartment may be tilted forwardly for access to the interior after the cover is raised.

My invention additionally comprehends the provision of a cover control mechanism for tiltable cabinets which embodies the features set forth and which also includes facilities such that the cover may be swung to an open position giving access to the interior of the compartment.

It is another object of the invention to provide a mechanism manually operable by a unitary control and which effects either a raising or lowering movement of the cover of a cabinet and the tilting movement of the storage compartment.

As a further object my invention provides for a mechanism in accordance with the preceding object, wherein rates of motion of the cover and storage compartment vary in accordance with their relative positions.

Other objects and advantages of the invention will be apparent from the following description and the accompanying drawings in which similar characters of reference indicate similar parts throughout the several views.

Referring to the six sheets of drawings,

Fig. 2 is a top plan view of the tiltable cabinet shown in Fig. 1 with parts cut away to illustrate certain details of the structure;

Fig. 4 is a fragmentary rear elevational view of a portion of the structure shown in Fig. 3 drawn to an enlarged scale and having parts cut away;

Fig. 5 is a fragmentary view of a portion of the structure shown in Fig. 3 drawn to an enlarged scale;

Fig. 6 is an end sectional view similar to Fig. 1 which depicts a modification of my invention;

Figs. 7 and 8 are, respectively, top plan and rear elevational views of the tiltable cabinet shown in Fig. 6, and wherein each has parts cut away to illustrate structural details;

Fig. 9 is a fragmentary sectional view of a portion of the structure shown in Fig. 6 drawn to an enlarged scale;

Fig. 10 is a fragmentary sectional view of a portion of the tiltable cabinet illustrated in Figs. 6, 7 and 8 drawn to an enlarged scale; and Fig. 11 is a fragmentary rear elevational view showing a part of the structure depicted in Fig. 8 with parts in different operating positions.

Both of the exemplary forms of my present invention which are depicted herein for purposes of illustration, are well adapted, although not limited, to refrigerator cabinet structures used for the preservation of frozen foods and the like and/or the freezing or storage of foods and the like. In such storage the foods are preserved in their frozen state and the expected time of preservation is longer than for foods stored at temperatures above freezing. Both of these factors reduce the desirability of having many articles accessible for momentary acquisition. Being generally in a solid state, such frozen foods may be packed closely together within the refrigerated compartment in order to effect full usage of the storage space. On the other hand, such packing of the refrigerated compartment makes it desirable to have ease of ready access to all parts of the storage compartment and to have a shelf conveniently disposed for use during the placement of material within, or the removal of material from, the refrigerator.

Figure 3:
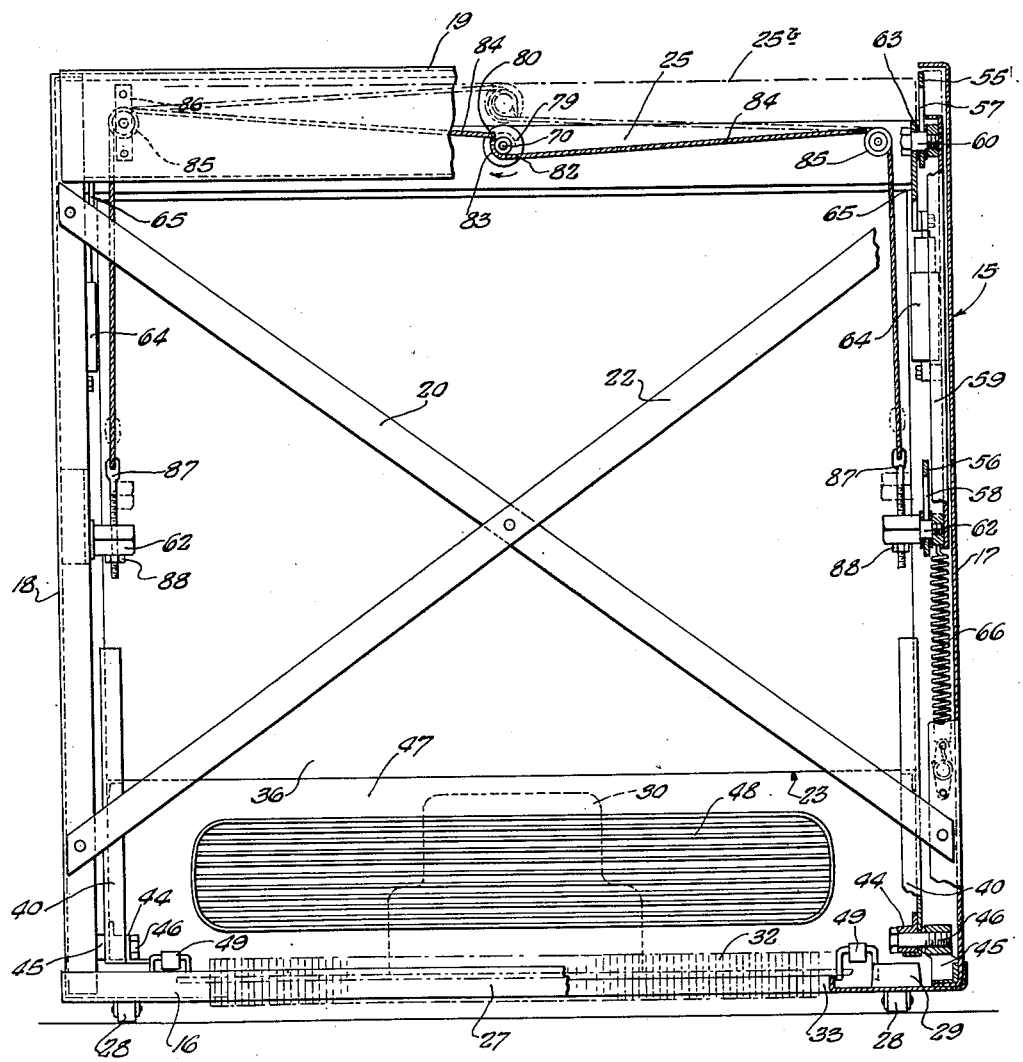
Fig. 3 is a rear elevational view of the tiltable cabinet shown in Figs. 1 and 2, wherein parts are also cut away to show details of the construction.

Generally considered, both of the disclosed forms of my refrigerator cabinet which are depicted in the accompanying drawings include an outer casing 15 which comprises a base 16, to which upwardly extending side walls 17 and 18 are secured in oppositely disposed and opposed relationship. At the rear, as shown in Fig. 3, the side walls are reenforced and laterally braced by a top cross strip 19 having its opposite ends secured to the side walls and by diagonally disposed cross braces 20 and 22.

A heat insulated container 23 defines a refrigerated food storage compartment 24 which, in the present instance, is open at the top and is adapted to be tightly closed by a heat insulating cover 25. For relative ease of access, even to articles placed in the bottom of the food storage compartment 24, and so that the cover 25 may be utilized as a temporary loading or unloading shelf, my refrigerator cabinet is so constructed that the cover may be raised linearly in a vertical direction while maintaining its level disposition. To facilitate ready access to the interior of the food storage compartment, the heat insulated container 23 is supported for tilting movement between the side walls 17 and 18 about an axis 26 near the base 16 and extending laterally of the side walls.

Having more detailed reference to the general features of the cabinet structure embodied in both of the modified forms of my invention, the base 16 is desirably made of formed sheet metal and has a flanged reenforcing edge 27. Support for the cabinet with the base 16 somewhat raised from the floor level is provided by casters 28 mounted for rotational movement relative to the base. In order to limit the height of the base 16 above the floor, the casters are desirably disposed in inverted cup-shaped deformed portions 29 of the base 16 which are located near the corners of the base.

Although various types of refrigeration units are suited to use with the disclosed cabinet and such refrigeration units may be mounted in various ways and at different positions relative to the cabinet, I have indicated a refrigeration unit 30 in dot and dash lines, which unit is secured to the base below the heat insulated container and between the side walls. A condenser unit 32 is also indicated in dot and dash lines and is secured to the base adjacent the refrigeration unit and desirably adjacent an opening 33 in the mid-portion of the base.

Figure 1:
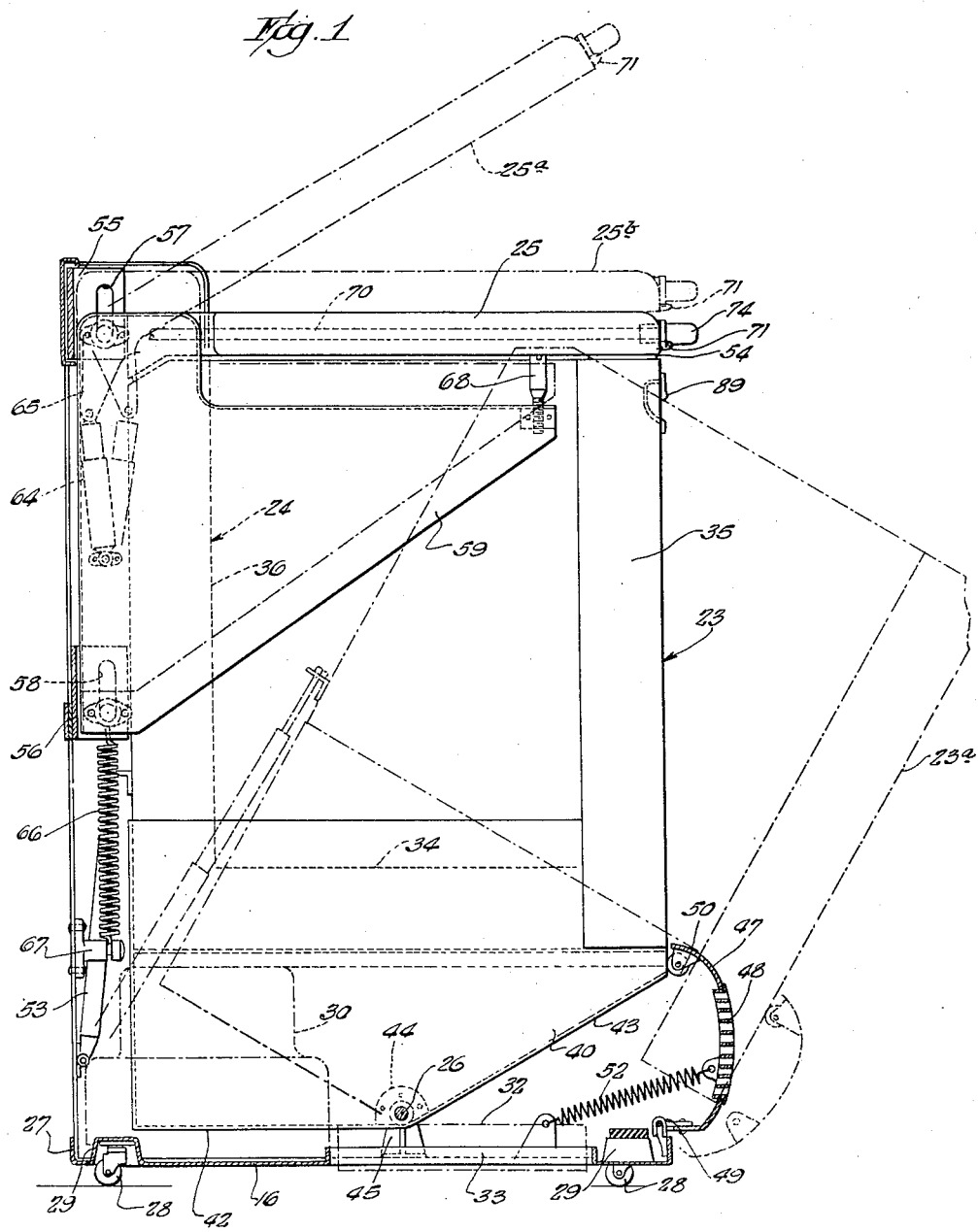
Fig. 1 is an end sectional view of a preferred embodiment of my tiltable cabinet, wherein the section is taken on a line 1—1 of Fig. 2 and various operating positions of the parts are depicted in dot and dash lines.

As shown in Figs. 1 and 2, the heat insulated container 23, which provides the food storage compartment, has a bottom 34, front and rear walls 35 and 36, respectively, and side walls 37, which walls are desirably constructed with suitably shaped exterior and interior metal shells 38 and 39, respectively, secured together at the top and bottom by suitable means, such as welding. The shells defining the walls are spaced apart to provide substantial wall thickness and the space therebetween is filled with a suitable heat insulating material. In order to avoid the use of space within the food storage compartment for a separate evaporator unit, I prefer to use the interior metal shell 39 as the inner wall of an evaporator unit, which is connected to the refrigeration unit in the usual manner.

To support the heat insulated container 23 for tilting movement between upright and tilted positions, such as those indicated at 23 and 23a in Fig. 1, metal plates 40 are secured to each end of the container near the bottom thereof and extend downwardly from those ends below the bottom of the container. Each such metal plate 40 has lower edges 42 and 43 disposed in obtuse angular relationship with the vertex of the obtuse angle near the mid-portion of the base from front to rear. Each of the metal plates 40 carries a bearing 44 near the vertex of the angularly disposed lower edges 42 and 43. Brackets 45 are secured to the mid-portion of opposite sides of the base 16 and carry suitable support means, such as cap screws 46, upon which the bearings 44 are rotatably mounted to provide a hinge support for the heat insulated container. The height of the metal plates 40 is sufficient to provide ample room for the circulation of cooling air around the refrigeration unit.

Although the back of the outer casing is substantially open to permit the free circulation of air around the refrigeration unit 30 and condenser 32, I have provided a cover 47 at the front of the cabinet which covers the space between the base and the front surface of the heat insulated container for improving the appearance. The cover 47 is provided with a series of louvers 48 which permit the flow of air into the space below the insulated container and across the condenser and refrigeration unit from the front of the cabinet. In order that the cover 47 may be free to move with the insulated container 23 when it is tilted, hinges 49 are provided at the lower edge of the cover by which it is connected to the base. Rollers 50 are preferably secured to opposite sides of the upper edge of the cover to engage the front surface of the heat insulated container and roll along that surface during the tilting movements of the container. A tension spring 52 resiliently biases the cover 47 toward the front surface of the container and keeps the cover rollers in engagement with the container while permitting its swinging movement during the tilting of the container.

In order to cushion the movements of the heat insulated container, particularly near the extremities of such movements, I prefer to provide a fluid controlled dashpot 53 having one end hingedly anchored by suitable means to the outer casing and its other end secured to the rear wall of the heat insulated container. The preferred action of the dashpot is such that it prevents quick or sudden movements of the container in either direction after the tilting has been started, and prevents jolts to the container or its contents at the extremities of the tilting movement.

As in the instance of the walls of the heat insulated container 23, the cover 25 desirably is made with a metal shell of suitable thickness filled with heat insulating material. A gasket 54 of relatively flexible heat insulating material is secured to the surface of the cover adjacent the upper surfaces of the walls of the heat insulated container 23 to provide a suitable seal between the cover and the container when the cabinet is closed.

In both of the presently disclosed forms of my refrigerator cabinet, provision is made for the linear vertical movement of the cover 25 away from the heat insulated container 23 when the cabinet is opened and the maintenance of the cover in a substantially level position for use as a shelf. For supporting the cover 25 for such linear movement, I have provided brackets 55 and 56 having vertical side portions at oppositely disposed positions adjacent each of the side walls 17 and 18, which brackets have therein vertically disposed and elongated slots 57 and 58, respectively, and are secured to the rear edge portions of the side walls. Oppositely disposed cover support arms 59, which are generally triangular in shape, extend forwardly from positions adjacent the brackets 55 and 56 along the inner surfaces of the side walls 17 and 18 and between those side walls and the outer side surfaces of the heat insulated container 23. Studs 60 and 62 are secured to the cover support arms 59 and have bearing portions extending inwardly therefrom through the slots 57 and 58, respectively, in the brackets 55 and 56; the bearing portions of the studs being slidable longitudinally of the slots. Straps 63 project rearwardly from opposite sides of the rear surface of the cover and are carried by the studs 60 to support the rear edge of the cover.

In the form of my refrigerator cabinet disclosed in Figs. 1 to 5, inclusive, the straps 63 are rotatably carried by the studs 60 and the front portion of the cover is so supported that it is free to swing upwardly about the axis of the studs 60 for opening the cabinet when the food storage compartment is in either its upright or tilted positions. Such upward swinging movement of the cover is indicated in dot and dash lines at 25a in Fig. 1. For maintaining the cover in a raised position, such as that indicated at 25a, and also for biasing the cover to its closed position with the gasket 54 firmly pressed against the top surface of the heat insulated container, I have provided spring-urged toggle mechanisms, each including a compression spring enclosed within a housing 64 having telescopically-engaging end portions. One end of each of the housings 64 is anchored for swinging movement to one of the side walls of the outer casing. The other end of each housing is rotatably connected to an extension arm 65 on each of the straps 63. The angular dispositions of the housings 64 and extension arms 65 are such that the force of the compression springs within the housings act to urge the cover toward its closed position against the heat insulated compartment when the cover is closed, and cross a center line of action during the upward movement of the cover so as to urge the cover upwardly when it has passed a predetermined position in its upward movement.

In the disclosed forms of my refrigerator cabinet, at least one tension spring 66 is utilized to assist gravitational force in biasing the rear portion of the cover toward the heat insulated container and to urge the arms 59 downwardly relative to the brackets 55 and 56. One end of the spring is secured to one of the arms 59 and its other end is secured to a bracket 67 on the rear of the outer casing.

Since the cover of the refrigerator cabinet shown in Figs. 1 to 5, inclusive, may be swung upwardly as well as being movable linearly away from the heat insulated container, and also since the cover is biased downwardly toward its closed position by the toggle mechanisms, an adjustable stop 68 is mounted at the forward end of each of the arms 59. As shown in Fig. 1, each stop 68 comprises a screw threaded into the arm at a position such that it underlies one side edge of the front portion of the cover.

In the form of my invention disclosed in Figs. 6 to 11, inclusive, there is no provision made for the upward swinging movement of the cover 25. Hence, there is no toggle mechanism provided for biasing the cover toward the top surface of the heat insulated container. However, it may be readily understood that the structure shown in Figs. 6 to 11 is well adapted to provisions for allowing upward swinging movement of the cover by the inclusion of the toggle mechanisms and front cover supports as shown in the previously described figures and the addition of swivel joints in the laterally extending actuating rods. Adjustable elements 69, however, are connected to both the cover and the arms 59 near the extending ends of the arms so that the biasing force of the tension spring 66 is effective through the arms 59 to urge both the front and rear portions of the cover toward the heat insulated container.

In Figs. 1 to 5, inclusive, I have disclosed one preferred type of mechanism adapted to manual operation by the turning of a conveniently accessible handle for controlling and effecting the linear raising and lowering movement of the cover 25. As shown in Fig. 2, a shaft 70 extends through the mid-portion of the cover 25 and is journaled for rotational movement by suitable bearings 72 and 73 at the front and rear edges of the cover. At the front end of the shaft, and adjacent the front edge of the cover, a handle 74 is drivingly secured thereto and desirably has an inwardly projecting end portion 75 adapted to engage sockets 76 and 77 on opposite sides of the shaft. Stops 71 are secured to the front edge of the cover below each socket and project outwardly to prevent turning of the handle the wrong way or beyond the sockets.

At the rear end of the shaft the bearing 73 provides a socket for holding one end of a compression spring 78 which surrounds a portion of the projecting end of the shaft. The other end of the compression spring rests against a pulley 79 secured to the projecting end of the shaft in spaced relationship to the rear edge of the cover. Normally, the spring 78 biases the shaft axially to hold the projecting end 75 of the handle in one of the sockets 76 or 77 until removed by the application of manual force. In turning between the two sockets, the handle 74 and shaft 70 are rotated through substantially half a revolution.

As shown in Figs. 3 and 5, the pulley 79 has openings 80 and 82 extending axially therethrough near the periphery, which openings are desirably disposed at diametrically opposite positions in the pulley. Tension-transmitting means, such as a flexible cable 83, is threaded through the openings 80 and 82 so as effectively to anchor the cable to the pulley at the diametrically opposite positions of the openings. Opposed side portions 84 of the cable 83 extend in substantially opposite directions from the pulley 79 and are aligned with a grooved edge portion of the pulley.

At opposite ends of the top cross strip 19 on the rear of the outer casing, pulleys 85 are rotatably supported at fixed positions near the side walls of the outer casing by brackets 86. Below the pulleys 85, adjustable anchor screws 87 extend through the projecting head portions of the studs 62 and have coacting nuts 88 thereon for controlling the effective length of the anchor screws.

The opposite side portions 84 of the cable each extend over one of the pulleys 85 and are respectively anchored to one of the anchor screws 87. Since the studs 62, which carry the anchor screws, are secured to the arms 59, tension applied through the end portions of the cables, lifts those arms so that the studs 60 and 62 move upwardly in the slots 57 and 58 to raise the cover 25 linearly and provide support for the cover while it is raised away from the top of the heat insulated container. Adjustment of the anchor screws 87 equalizes the tension in the cable end portions in order to effect equalized upward movement of the cover on its two sides.

Since the cable 83 is anchored at its mid-portion to the pulley 79, the rotation of that pulley by manual force applied to the handle 74 at the front of the cabinet turns the pulley and applies the tension to the cable ends for raising the cover. The size of the pulley is such that the one-half turn of movement of the handle 74 between the sockets 76 and 77 effects movement of the cover between the position indicated in solid lines and that indicated in dot and dash lines at 25b in Figs. 1 and 3. The separation of those positions is sufficient to provide clearance for the tilting movement of the heat insulated container.

Desirably, the rate of upward movement of the cover is rapid in proportion to the rate of movement of the handle at the beginning of such upward movement so that the cover is quickly separated from the heat insulated container. To effect this result, the positions of the openings 80 and 82 in the pulley 79 are normally so disposed that the rotary motion of the pulley effects a relatively linear movement of the cable ends at the beginning of the handle movement for raising the cover. To raise the cover with the parts in the relative positions disclosed in Fig. 2, the handle is moved from the position shown in solid lines to that indicated in dot and dash lines at 74a. The direction of rotation of the pulley for effecting such upward movement is indicated by an arrow in Fig. 3. As may be readily understood by noting the normal position of the openings 80 and 82 in Fig. 3, the initial rotary movement of the pulley 79 is translated almost directly into linear movement of the cable end portions during the first quarter turn, after which the rate of upward movement of the cover corresponding to a given movement of the handle will decrease to a certain extent.

Thus, one manner of opening the refrigerator cabinet disclosed in Figs. 1 to 5, inclusive, is to swing the cover upwardly without turning the handle 74. After the cover has been swung upwardly, the heat insulated compartment may be tilted forwardly by manual force applied to a handle 89. While open the cover is held in the raised position by the spring-urged toggle mechanisms acting through the extension arms 65 at the rear of the cover. The cabinet is closed by reverse movements of the parts, with the heat insulated container being first moved to its upright position before the cover is swung downwardly. Movements of the heat insulated container in both directions are cushioned by the dashpot 53. The spring-urged toggle mechanisms assist the gravitational force and the force of the tension spring 66 for providing close sealing engagement of the gasket 54 with the top of the heat insulated compartment, particularly at the front portion thereof, when the cover is closed.

When it is desired, on the other hand, to use the cover as a conveniently disposed shelf during the removal of material from the food storage compartment, or the placement of material therein, the cover is raised linearly to the position indicated at 25b by manual rotation of the handle 74 through one-half turn from its locked position of engagement with the socket 76 to a locked position of engagement with the socket 77. When thus raised, the cover is moved upwardly with the arms 59 and is supported therefrom by the studs 60 and the adjustable stops 68. After the cover has been raised, the heat insulated container 23 may be tilted between its upright and open positions. With the heat insulated container in the upright position, the cover is moved to its closed position by reverse rotation of the handle 74. In the latter instance, the handle is used to restrain the downward movement of the cover which is produced by gravity and the biasing force of the tension spring 66.

In the modified form of my invention which is illustrated in Figs. 6 to 11, inclusive, the cover 25 may not be swung upwardly but both the linear lifting of the cover and the tilting movement of the heat insulated container are effected and controlled by the manual movement of a handle 90 which is desirably disposed at the front of the cover. The actuating mechanism for effecting the upward movement of the cover is practically the same as that illustrated and described with respect to the form shown in Figs. 1 to 5, inclusive, and like reference numerals applied to the parts of that mechanism in Figs. 6 to 11, inclusive, refer to parts which perform substantially similar functions.

Rather than utilize axial movement of the shaft 79 for effecting engagement and disengagement of the handle 90 in Figs. 6 to 11, inclusive, with the sockets 76 and 77, the handle 90 is provided with a knob 92 carried by a plunger 93 aligned for engagement with the sockets 76 and 77 and linearly movable toward and from the sockets. A compression spring 94 disposed between linearly separated portions of the handle 90 and the plunger 93 normally biases the plunger 93 toward a position of engagement with the sockets.

In addition to the mechanism for raising the cover, which is similar to that described in connection with Figs. 1 to 5, inclusive, the modified form of my invention includes parts actuated by the same handle for effecting tilting movement of the heat insulated container 23. That is, on diametrically opposite sides of a pulley 95 which controls the cover-raising mechanism, are radially projecting arms 96. At opposite top corners, the outer casing 15 has diagonal braces 97 upon which bell cranks 98 are rotatably supported by means, such as studs 99, in oppositely disposed positions and in opposed relationship laterally of the cabinet. Each of the bell cranks 98 has angularly disposed arms 100 and 102 which serve in changing the direction of force applied thereto. In the present instance, tension-transmitting elements in the form of relatively rigid rods 103 are utilized to connect the ends of the arms 96 on the pulley 95 to the ends of the bell crank arms 100. Additional rods 104 have their upper ends connected to the respective bell crank arms 102 and extend downwardly with their lower ends each threaded into a yoke 105. The yokes 105 are in turn rotatably connected to brackets 106 secured to the rear ends of the metal plates 40 below the bottom of the heat insulated container 23.

Rotational movement of the pulley 95 in a clockwise direction, as viewed in Fig. 8, which effects raising movement of the cover 25 to the position indicated in dot and dash lines at 25b, also exerts forces through the rods 103 and 104 and the bell cranks 98 to apply a lifting force to the rear end of the support plates for the heat insulated container, whereby forward tilting movement of the heat insulated container is effected. During the progress of such movement, pulley 95, rods 103 and 104, and bell cranks 98 are moved substantially to the position depicted in Fig. 11, in which position the heat insulated container 23 is moved to the position shown in dot and dash lines at 23a in Fig. 6. Reverse movement of the handle 90 rotates the pulley 95 in the opposite direction (counterclockwise as viewed in Figs. 8 and 11) to exert compressive forces through the rods 103 and 104, whereupon the force applied to the rear of the support for the heat insulated container is in a downward direction to move the container back to its upright position. During the latter described movement, the cover is returned to its closed position.

In order to avoid appreciable or detrimental frictional movement between the cover-sealing gasket 54 and the upper surface of the heat insulated container, the cover is desirably moved upwardly to effect a separtion of the gasket from the surface of the container before there is any appreciable tilting movement of the container. This result is effected by pre-selection of the relative dispositions of the cable-anchoring openings 80 and 82 to the ends of the arms 96 to which the rods 103 are connected. That is, the relatively quick and rapid start of the upward movement of the cover 25 is effected in the manner described in connection with the disclosure of Figs. 1 to 5, inclusive. On the other hand, the relative positions of the arms 96 and rods 103 when the cover is closed, and as shown in Fig. 8, are such that the initial rotational movement of tthe arms 96 in the direction of the arrows shown in Fig. 8 produces no appreciable tilting movement of the heat insulated container. As shown in Fig. 8, the initial movement of the arms 96 is practically transverse to the axes of the rods 103. Thus, during such initial movement, there is no appreciable component tending to tilt the heat insulated container. As the movement of the arms 96 progresses, the component tending to tilt the heat insulated container gradually increases, but by the time such movement becomes appreciable, the cover has moved to a position of clearance and remains clear of all parts of the top surface of the heat insulated container.

In addition to providing the delayed start in the tilting movement of the container, the rods 103 and arms 96 have normal positions, as shown in Fig. 8, out of alignment and such that the locking of the position of the arms 96 by the handle 90 holds the heat insulated container in its upright position. It may be observed in Fig. 8 that in moving in a clockwise direction for effecting the opening movement of the cover and tilting movement of the container, the longitudinal axes of the arms 96 pass positions in alignment with the axes of the rods 103. It is not until after the position of alignment has been passed that the tilting movement of the container is started and the normal angular displacement of the arms and rods from that position of alignment in a direction reverse to that required for tilting the container places the rods 103 in positions for bracing the tilting mechanism against movement of the container by forces other than those applied through the use of the handle 90.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In combination with the tiltable cabinet having a base, side walls secured to and extending upwardly from the base, a storage compartment open at the top and hingedly supported on the base between said side walls for tilting movement in a direction parallel to the side walls and between upright and forwardly tilted positions, and a cover for the storage compartment supported for linear vertical movement from and toward the open top of the storage compartment when said compartment is in the upright position, a cover actuating and control mechanism comprising a pair of side arms extending forwardly from the rear of the cabinet between said side walls and the storage compartment, means supporting said side arms for linear vertical movement relative to the side walls, means for supporting said cover from the side arms for movement therewith, a shaft journaled in said cover for rotational movement and extending through the mid-portion thereof from front to rear, a handle secured to the front end of the shaft adjacent the front edge of the cover, pulley means secured to the rear end of the shaft adjacent the rear edge of the cover, a cable anchored at its mid-portion to said pulley means and having opposite end portions, a pair of cable guide pulleys, means for rotatably supporting said cable guide pulleys in substantial alignment with said pulley means and in fixed positions near the opposite side walls, and adjustable cable anchors secured to the rear ends of said side arms below said cable guide pulleys, the opposite ends of said cable being secured to said cable anchors so that rotation of the pulley means applies stress to both end portions of the cable to raise said arms and cover.

2. The combination of claim 1 wherein the axes of said cable guide pulleys are disposed on a line substantially midway between the normal limits of movement of the axis of said pulley means.

3. The combination of claim 1 and characterized by means for limiting the rotational movement of said shaft and pulley means to substantially one-half of a revolution, and means anchoring opposite ends of said cable to said pulley means at positions such that upward movement of said arms and cover starts rapidly during initial rotation of said shaft in one direction and decreases in rate near the upper limit of normal movement of the cover.

4. The combination of claim 1 and further characterized by means for hingedly connecting said cover to said side arms for swinging movement about an axis disposed along the rear edge of the cover, adjustable means for limiting the movement of the front portion of the cover toward the side arms, and resilient toggle means for biasing the cover toward said arms when its angular position relative to the arms is below a predetermined level and biasing said cover away from the arms when its angular position is above said level.

5. The combination of claim 1 and further characterized by means for connecting one edge of said cover to the side arms, and means spaced from the last mentioned means for adjustably connecting the cover to the side arms.

6. The combination of claim 1 and further characterized by lever arms extending in opposite directions from said pulley means in fixed relationship to said shaft, bell cranks disposed on opposite sides of said lever arms and having angularly projecting arms, means for supporting each of said bell cranks for rotation about a fixed axis, a link connecting each of said lever arms to one of said bell crank arms, adjustable anchor means on said storage compartment below the bell cranks and spaced from the axis of tilting movement of the compartment, and a link connecting the other arm of each of said bell cranks to one of the last mentioned adjustable anchor means so that rotation of said shaft applies force through said links for effecting tilting movement of the storage compartment.

7. In a tiltable cabinet having a base, a storage compartment open at the top and hingedly supported on the base for tilting movement about a fixed axis near the base between upright and forwardly tilted positions, and a cover for the storage compartment, the combination comprising cover-supporting arms extending along opposite sides of the storage compartment in directions lateral to the axis of tilting movement of the compartment, means for supporting said arms for linear movement in a direction substantially perpendicular to the open top of the storage compartment when the compartment is in said upright position, means for supporting the cover from the side arms for movement therewith, a shaft, means for supporting said shaft for rotational movement, means for manually actuating said shaft, anchor means secured to said shaft for rotation therewith, force-transmitting elements anchored at diametrically opposite positions to said anchor means and extending therefrom in opposed directions, means at opposite sides of said cabinet for changing the direction of the force transmitted through said force-transmitting elements, additional anchor means secured to each of said side arms, said force-transmitting elements being secured to said additional anchor means for effecting movements of said arms and cover in response to rotational movements of said shaft.

8. In a tiltable cabinet as defined in claim 7, said anchor means and shaft having normal limits of movement corresponding to closed and raised positions of the cover, said means for changing the direction of the force transmitted through said force-transmitting elements including pulleys, and means for supporting said pulleys in positions such that their axes are substantially midway between the normal limits of movement of the cover.

9. In a tiltable cabinet as defined in claim 7, the diametrically opposite positions at which said force-transmitting elements are anchored to said anchor means being so normally disposed when said cover is in the closed position that the initial upward movement of the cover relative to the storage compartment is relatively large in comparison to the angular movement of the shaft.

10. The combination of claim 7, wherein said means for supporting the cover from the side arms includes means for providing a hinge connection therebetween along one edge of the cover, and means for adjusting the spacing of the cover and arms at a distance from the last mentioned means.

11. The combination of claim 7, wherein said means for supporting the cover from the side arms includes means for providing a hinge connection therebetween along one edge of the cover, and resilient toggle means for biasing the cover toward said arms when the angular position of the cover relative to the arms is within predetermined limits and biasing said cover away from the arms when their relative angular position is outside of said predetermined limits.

12. In a tiltable cabinet having a base, a storage compartment open at the top and hingedly supported on the base for tilting movement about a fixed axis near the base between upright and forwardly tilted positions, and a cover for the storage compartment, the combination comprising cover-supporting arms extending along opposite sides of the storage compartment in directions lateral to the axis of tilting movement of the compartment, means for supporting said arms for linear movement in a direction substantially perpendicular to the open top of the storage compartment when the compartment is in said upright position, means for supporting the cover from the side arms for movement therewith, a shaft, means for supporting said shaft for rotational movement, means for manually actuating said shaft, anchor means secured to said shaft for rotation therewith, force-transmitting elements anchored at diametrically opposite positions to said anchor means and extending therefrom in opposed directions, means at opposite sides of said cabinet for changing the direction of the force transmitted through said force-transmitting elements, additional anchor means secured to said storage compartment at symmetrically disposed positions on one side of said axis of tilting movement, and means secured to said additional anchor means and extending to said direction-changing means for effecting tilting movements of said storage compartment in response to rotational movements of said shaft.

13. The combination of claim 12 wherein said diametrically opposite positions at which said force-transmitting elements are anchored to the anchor means are so normally disposed when the food storage compartment is in said upright position that the initial tilting movement of the food storage compartment is relatively small in comparison to the angular movement of the shaft and increases during the progress of movement of the shaft.

14. The combination of claim 12, wherein said means for changing the direction of the force transmitted through the force-transmitting elements includes bell cranks, and said force-transmitting elements comprise relatively rigid links.

15. In combination with a tiltable cabinet including a storage compartment having a top opening and mounted for rocking movement between a normal upright position and a tilted position, a cover for said top opening having a cabinet-closing position corresponding to the upright position of the storage compartment, and a support carrying said cover for movement relative to the storage compartment, means actuated by manual movements of a handle for separately effecting linear movement of said cover away from the storage compartment to provide clearance for the rocking movement of the storage compartment and for effecting return movement of the cover to the cabinet-closing position, and means for releasably retaining the cover in a position away from the storage compartment.

16. In combination with a tiltable cabinet including a storage compartment having a top opening and mounted for rocking movement between a normal upright position and a tilted position, a cover for said top opening having a cabinet-closing position corresponding to the upright position of the storage compartment, and a support carrying the cover for movement relative to the storage compartment, means actuated by the rotational movements of a handle for simultaneously effecting linear movement of said cover and rocking movement of said storage compartment, said linear movement of the cover being so proportioned to the rocking movement of the storage compartment that said cover clears the storage compartment.

17. In combination with a tiltable cabinet including a storage compartment having a top opening and mounted for rocking movement between a normal upright position and a tilted position, a cover for said top opening having a cabinet-closing position corresponding to the upright position of the storage compartment, and a support carrying the cover for movement relative to the storage compartment, a mechanism including a manually operable handle for simultaneously effecting linear movement of said cover and rocking movement of said storage compartment, said linear movement of the cover being so proportioned to the rocking movement of the storage compartment that said cover clears the storage compartment.

18. In combination with a tiltable cabinet including a storage compartment having a top opening and mounted for rocking movement between a normal upright position and a tilted position, a cover for said top opening having a cabinet closing position corresponding to the upright position of the storage compartment, and a support carrying said cover for movement relative to the storage compartment, connected force-transmitting elements actuated by manual movements of a handle for separately effecting linear movement of said cover away from the storage compartment to provide clearance for the rocking movement of the storage compartment and for effecting return movement of the cover to the cabinet-closing position, and a latch-type mechanism for releasably retaining the cover in a position away from the storage compartment.

CHARLES G. MINOR.

REFERENCES CITED

The following references are of record in the file of this patent:

UNITED STATES PATENTS

| Number | Name | Date |
|---|---|---|
| 1,443,858 | Windecker | Jan. 30, 1923 |
| 2,386,929 | Brown | Oct. 16, 1945 |